(12) United States Patent
Wang et al.

(10) Patent No.: US 8,888,878 B2
(45) Date of Patent: Nov. 18, 2014

(54) COATED ABRASIVE AGGREGATES AND PRODUCTS CONTAING SAME

(75) Inventors: Jianna Wang, Grafton, MA (US);
James J. Manning, Braintree, MA (US);
Paul S. Goldsmith, Stow, MA (US);
Anthony C. Gaeta, Lockport, NY (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 393 days.

(21) Appl. No.: 13/341,893

(22) Filed: Dec. 30, 2011

(65) Prior Publication Data

US 2012/0192500 A1     Aug. 2, 2012

Related U.S. Application Data

(60) Provisional application No. 61/428,811, filed on Dec. 30, 2010.

(51) Int. Cl.
    *C09K 3/14*          (2006.01)

(52) U.S. Cl.
    CPC .................................. *C09K 3/1463* (2013.01)
    USPC .............................................. 51/307; 51/302

(58) Field of Classification Search
    CPC ....................................................... C09K 3/14
    See application file for complete search history.

(56) References Cited

U.S. PATENT DOCUMENTS

| | | |
|---|---|---|
| 2,277,520 A | 3/1942 | Martin et al. |
| 3,928,949 A | 12/1975 | Wagner |
| 4,018,574 A | 4/1977 | Dyer |
| 4,547,204 A | 10/1985 | Caul |
| 4,576,612 A | 3/1986 | Shukla et al. |
| 4,609,380 A | 9/1986 | Barnett et al. |
| 4,629,473 A | 12/1986 | Ruid et al. |
| 4,644,703 A | 2/1987 | Kaczmarek et al. |
| 4,652,275 A | 3/1987 | Bloecher et al. |
| 4,751,138 A | 6/1988 | Tumey et al. |
| 4,842,619 A | 6/1989 | Fritz et al. |
| 4,867,759 A * | 9/1989 | Tiefenbach et al. ............ 51/298 |
| 4,918,874 A | 4/1990 | Tiefenbach, Jr. |
| 4,920,082 A | 4/1990 | Danielson |
| 5,011,513 A | 4/1991 | Zador et al. |
| 5,014,468 A | 5/1991 | Ravipati et al. |
| 5,094,670 A | 3/1992 | Imada |
| 5,108,463 A | 4/1992 | Buchanan |
| 5,137,542 A | 8/1992 | Buchanan et al. |
| 5,171,224 A | 12/1992 | Tucker |
| 5,198,292 A | 3/1993 | Lerner et al. |
| 5,219,462 A | 6/1993 | Bruxvoort et al. |
| 5,256,170 A | 10/1993 | Harmer et al. |
| 5,304,586 A | 4/1994 | Hammesfahr et al. |
| 5,328,716 A | 7/1994 | Buchanan |
| 5,360,462 A | 11/1994 | Harmer et al. |
| 5,431,596 A | 7/1995 | Akita et al. |
| 5,436,063 A | 7/1995 | Follett et al. |
| 5,437,754 A | 8/1995 | Calhoun |
| 5,549,719 A | 8/1996 | Lee et al. |
| 5,667,541 A | 9/1997 | Klun et al. |
| 5,672,097 A | 9/1997 | Hoopman |
| 5,730,764 A | 3/1998 | Williamson et al. |
| 5,766,277 A | 6/1998 | DeVoe et al. |
| 5,833,724 A | 11/1998 | Wei et al. |
| 5,863,239 A | 1/1999 | Barton, II |
| 5,863,306 A | 1/1999 | Wei et al. |
| 5,863,847 A | 1/1999 | DeVoe et al. |
| 5,906,490 A | 5/1999 | Kramer Primus et al. |
| 5,913,716 A | 6/1999 | Mucci et al. |
| 5,924,917 A | 7/1999 | Benedict et al. |
| 6,024,634 A | 2/2000 | Hoglund et al. |
| 6,077,601 A | 6/2000 | DeVoe et al. |
| 6,155,910 A | 12/2000 | Lamphere et al. |
| 6,197,076 B1 | 3/2001 | Braunschweig et al. |
| 6,231,629 B1 | 5/2001 | Christianson et al. |
| 6,238,450 B1 | 5/2001 | Garg et al. |
| 6,261,682 B1 | 7/2001 | Law |
| 6,287,184 B1 | 9/2001 | Carpentier et al. |
| 6,395,044 B1 | 5/2002 | Swei et al. |
| 6,406,576 B1 | 6/2002 | Benedict et al. |
| 6,451,076 B1 | 9/2002 | Nevoret et al. |
| 6,517,423 B2 | 2/2003 | Ueno |
| 6,551,366 B1 | 4/2003 | D'Souza et al. |
| 6,551,974 B1 | 4/2003 | Conrad et al. |

(Continued)

FOREIGN PATENT DOCUMENTS

| | | |
|---|---|---|
| CN | 101068656 A | 11/2007 |
| CN | 101267915 A | 9/2008 |

(Continued)

OTHER PUBLICATIONS

SK Chemicals Co., Ltd., "Skybon, ES-120 Thermoplastic Copolyester for Solventborne Applications," 1 pg.
Norton, Saint-Gobain, "High-Performance Lapping Products for Roll Finishing," Copyright Saint-Gobain Abrasives, Inc., Rev. 2 pgs.
Burgess Pigment, "Burgess No. 98, Hydrous Aluminum Silicate" 1 pg.
ADM, "Material Safely Data Sheet—Yelkin TS", Preparation Date: Apr. 17, 2009, Revision Date: Apr. 17, 2009, 7 pgs.
Momentive, "Technical Data Sheet, EPON™ Resin 1001F", Re-issued Sep. 2007, 4 pgs.
Carbide Depot, "Hardness Conversion Chart", Technical Resources for Manufacturing Professionals, 3 pgs.
Woods, Susan, Cutting Tool Engineering Plus, "High-Velocity Grind", Feb. 2011, vol. 63, Issue 2, 9 pgs.
Werner Blank, "Isocyanate—TDI Isocyanate", Last edited on: Jul. 6, 2006, 3 pgs.
BYK Additives & Instruments, "BYK-410 Material Safety Data Sheet"Version 4, Revision Date Feb. 7, 2011, Print Date Feb. 7, 2011, 10 pgs.

(Continued)

*Primary Examiner* — Pegah Parvini
(74) *Attorney, Agent, or Firm* — Joseph P. Sullivan; Abel Law Group, LLP

(57) ABSTRACT

A coated abrasive product includes a particulate material containing green, unfired abrasive aggregates having a generally spheroidal or toroidal shape, the aggregates formed from a composition comprising abrasive grit particles, a nanoparticle binder, a dual function material, and a cross-linking agent. These green unfired abrasive aggregates can also be used in free abrasive products and bonded abrasive products.

19 Claims, 6 Drawing Sheets

(56) References Cited

U.S. PATENT DOCUMENTS

| | | |
|---|---|---|
| 6,645,624 B2 | 11/2003 | Wagle-Peterson et al. |
| 6,648,999 B2 | 11/2003 | Burdon et al. |
| 6,702,650 B2 | 3/2004 | Adefris |
| 6,753,359 B2 | 6/2004 | Thurber et al. |
| 6,773,475 B2 | 8/2004 | Ohishi |
| 6,790,126 B2 | 9/2004 | Wood et al. |
| 6,797,023 B2 | 9/2004 | Knapp et al. |
| 6,858,292 B2 | 2/2005 | Kendall |
| 7,005,080 B2 | 2/2006 | Holland et al. |
| 7,066,801 B2 | 6/2006 | Balijepalli et al. |
| 7,294,158 B2 | 11/2007 | Welygan et al. |
| 7,594,845 B2 | 9/2009 | Lugg et al. |
| 7,658,665 B2 | 2/2010 | Subramanian et al. |
| 7,981,173 B2 | 7/2011 | Ali et al. |
| 8,038,751 B2 | 10/2011 | Starling |
| 8,062,098 B2 | 11/2011 | Duescher |
| 8,105,453 B2 | 1/2012 | Kawamura et al. |
| 8,361,176 B2 | 1/2013 | Seth et al. |
| 2001/0003884 A1 | 6/2001 | Wei et al. |
| 2002/0090891 A1 | 7/2002 | Adefris et al. |
| 2003/0066246 A1 | 4/2003 | Swei et al. |
| 2003/0150169 A1 | 8/2003 | Annen |
| 2003/0175498 A1 | 9/2003 | Hunt et al. |
| 2003/0213182 A1* | 11/2003 | Knapp et al. .................... 51/295 |
| 2004/0067649 A1 | 4/2004 | Hellring et al. |
| 2004/0115431 A1 | 6/2004 | Chen et al. |
| 2005/0113005 A1 | 5/2005 | Woo et al. |
| 2005/0223649 A1 | 10/2005 | O'Gary et al. |
| 2006/0026904 A1 | 2/2006 | Woo |
| 2006/0046622 A1 | 3/2006 | Prasad |
| 2006/0148392 A1 | 7/2006 | Ono et al. |
| 2006/0183412 A1 | 8/2006 | Allison et al. |
| 2006/0260208 A1 | 11/2006 | Swei et al. |
| 2007/0066197 A1 | 3/2007 | Woo et al. |
| 2007/0243802 A1 | 10/2007 | Petersen et al. |
| 2007/0298240 A1 | 12/2007 | Gobena et al. |
| 2008/0092455 A1 | 4/2008 | You |
| 2008/0172951 A1 | 7/2008 | Starling |
| 2009/0011692 A1 | 1/2009 | Miekka et al. |
| 2010/0005727 A1 | 1/2010 | Gaeta et al. |
| 2010/0022170 A1 | 1/2010 | Starling et al. |
| 2010/0107509 A1 | 5/2010 | Guselin |
| 2010/0159805 A1 | 6/2010 | Goldsmith et al. |
| 2011/0045739 A1 | 2/2011 | Keijzer et al. |
| 2011/0053460 A1 | 3/2011 | Culler et al. |
| 2012/0192500 A1 | 8/2012 | Wang et al. |

FOREIGN PATENT DOCUMENTS

| | | |
|---|---|---|
| DE | 2350139 | 4/1975 |
| EP | 193296 A1 | 9/1986 |
| EP | 444824 A2 | 9/1991 |
| EP | 211591 B1 | 3/1993 |
| EP | 650803 A1 | 5/1995 |
| EP | 1339531 B1 | 8/2007 |
| EP | 2436747 A3 | 4/2012 |
| JP | 61192479 | 8/1986 |
| JP | 61297083 | 12/1986 |
| JP | 6234780 A | 2/1987 |
| JP | H01303626 | 12/1989 |
| JP | H04500044 A | 1/1992 |
| JP | 63052971 | 3/1998 |
| JP | 10-202538 A | 8/1998 |
| JP | 2003011068 | 1/2003 |
| JP | 2003062754 | 3/2003 |
| JP | 2003071729 | 3/2003 |
| JP | 2003511249 | 3/2003 |
| JP | 2004174712 | 6/2004 |
| JP | 2005515950 A | 6/2005 |
| JP | 2005522341 | 7/2005 |
| JP | 2006510499 | 3/2006 |
| JP | 2008000853 | 1/2008 |
| TW | 200422366 A | 11/2004 |
| WO | 9001397 A1 | 2/1990 |
| WO | 9201536 A1 | 2/1992 |
| WO | 0238338 A2 | 5/2002 |
| WO | 02102920 A1 | 12/2002 |
| WO | 2005099280 A2 | 10/2005 |
| WO | 2006050792 A1 | 5/2006 |
| WO | 2007035292 A1 | 3/2007 |
| WO | 2008008535 A1 | 1/2008 |
| WO | 2008091939 A3 | 7/2008 |
| WO | 2010011579 A2 | 1/2010 |
| WO | 2010075041 A2 | 7/2010 |

OTHER PUBLICATIONS

BYK Additives & Instruments, "BYK-410 Data Sheet—Liquid Rheology Additives for Solvent-borne and Solvent-free Systems" Data Sheet R200, Issue Feb. 2010, 4 pgs.
Rohm and Haas, "Adcote™ 545S/Coreactant F", Copyright Rohm and Haas, 2008, 3 pgs.
3M Innovation, "Systematic Processes for Finishing Wear Resistant Thermal Spray Coatings with Flexible Superabrasives, " Sponsored by ESTCP, JG-PP, PEWG, Nov. 19, 2003, 31 pgs.
3M Corporation, "Roll Grinding, Superfinishing and Microfinishing Systems," Superabrasives and Microfinishing Systems Division, Copyright 3M 1996, 12 pgs.
SKChemicals, Skybon Product Info, accessed Apr. 28, 2012 at http://www.skchemicals.com/english/products/poly/sub/sub3-1.asp, 2 pgs.
Cytec "Cymel® Amino Resin Crosslinkers for the Coating Industry, Product and Application Guide, Europe, Middle East and Africa", Copyright 2008 Cytec Industries, Inc., 42 pgs.
Air Products "Dabco © T-12 Catalyst", Copyright, Air Products and Chemicals, Inc., 2003, 2 pgs.
International Search Report for PCT/US2008/051785 mailed Aug. 6, 2008, 1 pg.
International Search Report for PCT/US2009/051045 mailed Mar. 3, 2010, 1 pg.
International Search Report for PCT/US2009/067914 mailed Jul. 26, 2010, 1 pg.
International Search Report for PCT/US2013/032402 mailed Jul. 1, 2013, 1 pg.
International Search Report for PCT/US2012/057852 mailed Mar. 5, 2013, 1 pg.
International Search Report for PCT/US2013/021039 mailed Apr. 25, 2013, 1 pg.
International Search Report for PCT/US2013/034700 mailed Jul. 13, 2013, 1 pg.
International Search Report for PCT/US2013/048730 mailed Sep. 11, 2013, 1 pg.
International Search Report for PCT/US2011/068249 mailed Aug. 29, 2012, 1 pg.

* cited by examiner

COATED ABRASIVE AGGREGATES AND PRODUCTS CONTAING SAME

CROSS-REFERENCE TO RELATED APPLICATION(S)

The present application claims priority from U.S. Provisional Patent Application No. 61/428,811, filed Dec. 30, 2010, entitled "COATED ABRASIVE AGGREGATES AND PRODUCTS CONTAINING SAME," naming inventors Jianna Wang, James Manning, Paul S. Goldsmith, and Anthony C. Gaeta, which application is incorporated by reference herein in its entirety.

BACKGROUND

1. Field of the Disclosure

The present disclosure is generally directed to abrasive particulate material, methods for making abrasive particulate material, abrasive products incorporating abrasive particulate material, and methods for machining workpieces with abrasive particulate material.

2. Description of the Related Art

Abrasive products generally contain or are formed from abrasive particulate material. Such abrasive particulate material can be used as a free abrasive, such as in the form of a slurry, or a fixed abrasive, typically either a coated abrasive or a bonded abrasive article. Abrasive products are used in various industries to machine workpieces, such as by lapping, grinding, or polishing. Machining utilizing abrasive articles spans a wide industrial scope from optics industries, automotive paint repair industries, dental applications, to metal fabrication industries. Machining, such as by hand or with use of commonly available tools such as orbital polishers (both random and fixed axis), and belt and vibratory sanders, is also commonly done by consumers in household applications. In each of these examples, abrasives are used to remove bulk material and/or affect surface characteristics of products (e.g., planarity, surface roughness).

Surface characteristics include shine, texture, and uniformity. For example, manufacturers of metal components use abrasive articles to fine polish surfaces, and oftentimes desire a uniformly smooth surface. Similarly, optics manufacturers desire abrasive articles that produce defect free surfaces to prevent light diffraction and scattering. Hence, the abrasive surface of the abrasive article generally influences surface quality.

Manufacturers also desire abrasive articles that have a high stock removal rate for certain applications. However, there is often a trade off between removal rate and surface quality. Finer grain abrasive articles typically produce smoother surfaces, yet have a lower stock removal rate. Lower stock removal rates lead to slower production and increased cost.

The surface characteristics and material removal rate can also be affected by the durability of the abrasive article. Abrasive articles that wear easily or lose grains can exhibit both a low material removal rate and can cause surface defects. Quick wear on the abrasive article can lead to a reduction in material removal rate, resulting in frequent exchanging of the abrasive article. Further, unwanted surface defects can lead to additional polishing steps. Both frequent exchanging of abrasive articles and additional polishing steps lead to slower production and increased waste associated with discarded abrasive articles.

Abrasive particle formation, such as through chemical synthesis routes or through bulk material processing routes (e.g., fusion and comminution), is considered a fairly well developed and mature art area. Accordingly, notable developmental resources have been dedicated to development of macrostructures, such as development of engineered abrasives products within the context of coated abrasives and particular three-dimensional structures and formulations in the context of bonded abrasives. Despite continued developments, a need continues to exist in the art for improved particulate material.

Abrasive particulate materials include essentially single phase inorganic materials, such as alumina, silicon carbide, silica, ceria, and harder, high performance superabrasive grains such as cubic boron nitride and diamond. Enhanced and even more sophisticated abrasive properties have been achieved through development of composite particulate materials. Such materials include formation of aggregates, which can be formed through slurry processing pathways that include removal of the liquid carrier through volatilization or evaporation, leaving behind green agglomerates, followed by high temperature treatment (i.e., firing) to form usable, fired agglomerates.

Such composite agglomerates have found commercial use in various abrasive product deployments. However, the industry continues to demand even further improved particulate materials, and particularly composite aggregates that may offer enhanced machining performance.

In particular, composite aggregate formulations that improve aggregate strength and exhibit other desirable properties are anti-loading properties are particularly desired.

SUMMARY

According to one embodiment, an aqueous mixture, or aqueous slurry, for forming an abrasive aggregate includes a plurality of abrasive grit microparticles, or abrasive grains; a nanoparticle binder; and at least one of the group consisting of a dual function material and a cross-linking agent, preferably both.

According to another embodiment, green, unfired abrasive aggregates having a generally spheroidal or toroidal shape include a plurality of abrasive grit microparticles, or abrasive grains; a nanoparticle binder; a dual function material, and a cross-linking agent.

According to another embodiment, a coated abrasive product that includes a substrate and particulate material bonded thereto, the particulate material comprising green, unfired abrasive aggregates having a generally spheroidal or toroidal shape, the aggregates formed from a composition comprising abrasive grit particles, a nanoparticle binder, a dual function material, and a cross-linking agent.

According to another embodiment, a method for forming abrasive particulate material includes forming a slurry comprising a liquid carrier, abrasive grit particles, a nanoparticle binder, a dual function material, and a cross-linking agent; and spray drying the slurry to form green, unfired composite aggregates containing the abrasive grit particles, the nanoparticle binder, the dual function material, and the cross-linking agent. Further, the aggregates are classified for use in an abrasive product.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
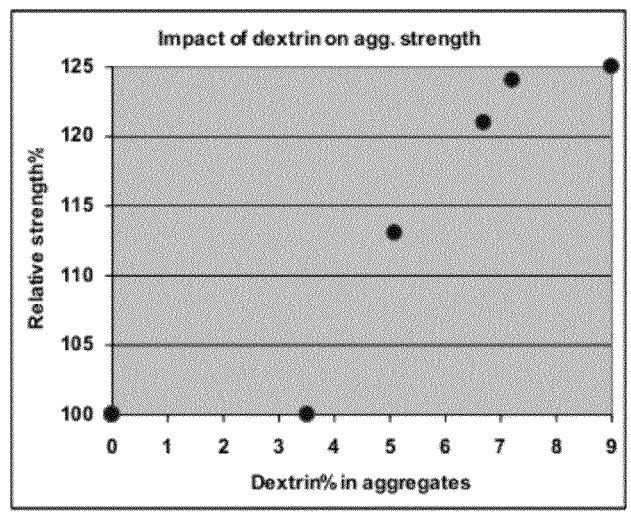
FIG. 1—is a chart showing the relative increase in strength of an aggregate due to the addition of a cross-linking agent, dextrin.

According to an embodiment, abrasive aggregates are provided that are particularly suitable for machining operations, in which abrasion is carried out to remove material and improve surface quality. Abrasive aggregates can be formed through slurry-based processing. Here, embodiments may take advantage of spray drying, where a slurry containing the constituent materials of the aggregates and a liquid carrier, such as water, are mixed together, nebulized into droplets, and dried. In more detail, certain embodiments combine an abrasive grit, which may be in the form of microparticles; a binder, which may be in the form of a nanoparticles; a dual function material which acts in the slurry as both a plasticizer, also known as a dispersant, while imparting anti-loading properties to the thus formed spray dried aggregates; a cross-linking agent, which promotes hydrogen bonding between the particles of binder and thus enhance the strength of the thus formed, spray dried aggregates.

As used herein, the term "microparticle" may be used to refer to a particle having an average particle size of from about 0.1 microns to about 50 microns, preferably not less than 0.2 microns, 0.5 microns, or 0.75 microns, and not greater than about 20 microns, such as not greater than 10 microns. Particular embodiments have an average particle size from about 0.5 microns to about 10 microns.

As used herein, the term "nanoparticle" may be used to refer to a particle having an average particle size of from about 5 nm to about 150 nm, typically less than about 100 nm, 80 nm, 60 nm, 50 nm, or less than about 40 nm. Typical average particle sizes of nanoparticles lie within a range of about 20 nm to about 50 nm As used herein, the term "aggregate" may be used to refer to a particle made of a plurality of smaller particles that have been combined in such a manner that it is relatively difficult to separate or disintegrate the aggregate particle into smaller particles by the application of pressure or agitation. This is in contrast to the term "agglomerate" used herein to refer to a particle made of a plurality of smaller particles which have been combined in such a manner that it is relatively easy to separate the aggregate particle or disintegrate the particle back into the smaller particles, such as by the application of pressure or hand agitation. According to present embodiments, the aggregates have a composite structure, including abrasive grits that have a size within the microparticle range, a nanoparticle binder that provides the matrix of the aggregate in which the abrasive grits are embedded or contained, a material that acts as both a plasticizer and anti-loading agent, and a cross-linking agent that promotes hydrogen bonding with the binder particles. As will be described in more detail, aggregates according to the embodiments have notable morphology, characterized by uniform distribution of the abrasive grits in the nanoparticle binder.

Of notable consequence, aggregates according to various embodiments are in the green, unfired state. Here, the aggregates are utilized as or in an abrasive product without notable post-formation heat treatment, such as calcining, sintering, or recrystallization, that alter the crystallite size, grain size, density, tensile strength, young's modulus, and the like of the aggregates. Such heat treatment processes are commonly carried out in ceramic processing to provide usable products, but are not utilized herein. Such heat treatment steps are generally carried out in excess of 400° C., generally 500° C. and above. Indeed, temperatures can easily range from 800° C. to 1200° C. and above for certain ceramic species.

The abrasive grit particles generally have a Mohs hardness of greater than about 3, and preferably from about 3 to about 10. For particular applications, the abrasive grit particles have a Mohs hardness not less than 5, 6, 7, 8, or 9. The abrasive grit particles are generally believed to serve as the primary active grinding or polishing agent in the abrasive aggregates. Examples of suitable abrasive compositions include non-metallic, inorganic solids such as carbides, oxides, nitrides and certain carbonaceous materials. Oxides include silicon oxide (such as quartz, cristobalite and glassy forms), cerium oxide, zirconium oxide, aluminum oxide. Carbides and nitrides include, but are not limited to, silicon carbide, aluminum, boron nitride (including cubic boron nitride), titanium carbide, titanium nitride, silicon nitride. Carbonaceous materials include diamond, which broadly includes synthetic diamond, diamond-like carbon, and related carbonaceous materials such as fullerite and aggregate diamond nanorods. Materials may also include a wide range of naturally occurring mined minerals, such as garnet, cristobalite, quartz, corundum, feldspar, by way of example. Certain embodiments of the present disclosure, take advantage of diamond, silicon carbide, aluminum oxide, and for cerium oxide materials, with diamond being shown to be notably effective. In addition, those of skill will appreciate that various other compositions possessing the desired hardness characteristics may be used as abrasive grit particles in the abrasive aggregates of the present disclosure. In addition, in certain embodiments according to the present disclosure, mixtures of two or more different abrasive grit particles can be used in the same aggregates.

As should be understood from the foregoing description, a wide variety of abrasive grit particles may be utilized in embodiments. Of the foregoing, cubic boron nitride and diamond are considered "superabrasive" particles, and have found widespread commercial use for specialized machining operations, including highly critical polishing operations. Further, the abrasive grit particles may be treated so as to form a metallurgical coating on the individual particles prior to incorporation into the aggregates. The superabrasive grits are particularly suitable for coating. Typical metallurgical coatings include nickel, titanium, copper, silver and alloys and mixtures thereof.

In general, the size of the abrasive grit particles lies in the microparticle range. It should be noted that the abrasive grit particles can be formed of abrasive aggregates of smaller particles such as abrasive aggregates nanoparticles, though more commonly the abrasive grits are formed of single particles within the microparticle range. For instance, a plurality of nano-sized diamond particles may be aggregated together to provide a microparticle of diamond grit. The size of the abrasive grit particles can vary depending upon the type of grit particles being used. For example, in certain embodiments of the present disclosure, silicon carbide grit particles are preferably used having a size of about 3 to about 8 microns. In other embodiments diamond grit particles are preferably used having a size of about 0.5 to 2 microns, such as about 1 micron. In still other embodiments, aluminum oxide grit particles are preferably used having a size of about 3 to about 5 microns.

The abrasive grit particles may, in general, before spray drying constitute between about 0.1% to about 50% by weight of the wet aggregate mixture. Preferably about 10% to about 40% by weight of the wet aggregate mixture. More preferably about 20% to about 40% by weight of the wet aggregate mixture. The abrasive grit particles may constitute between about 0.1% to about 85% by weight of the spray dried aggregates. The aggregates preferably include between about 10% to about 80% by weight of the abrasive grit particles. The aggregates more preferably include between about 20% to about 75% by weight of the abrasive grit particles. The aggregates most preferably include between about 30% to about 75% by weight of the abrasive grit particles.

In one embodiment according to the present disclosure, abrasive aggregates may be formed using a single size of abrasive grit particle, the size of the grit particle and the resultant aggregates both being tailored to the desired polishing application. In other embodiments, mixtures of two or more differently sized abrasive grit particles may be used in combination to form abrasive aggregates having advantageous characteristics attributable to each of the grit particle sizes.

The abrasive aggregates according to the present disclosure also include a nanoparticle binder material as stated above. The nanoparticle binder generally forms a continuous matrix phase that functions to form and hold the abrasive grit particles together within the abrasive aggregates in the nature of a binder. In this respect, it should be noted that the nanoparticle binder, while forming a continuous matrix phase, is itself generally made up of individually identifiable nanoparticles that are in intimate contact, interlocked and, to a certain extent, atomically bonded with each other. However, due to the green, unfired state of the thus formed aggregates, the individual nanoparticles are generally not fused together to form grains, as in the case of a sintered ceramic material. As used herein, description of nanoparticle binder extends to one or multiple species of binders.

While the grit material is believed to act as the primary abrasive, the nanoparticle material can also act as a secondary abrasive in some embodiments of the aggregates of the present disclosure. The size and polishing characteristics of the aggregates may be adjusted by varying parameters such as the composition of the nanoparticle binder material, the relative concentration ratio of nanoparticle binder material to abrasive grit particle, and the size of the abrasive grit particles. The nanoparticle binder material may itself comprise very fine ceramic and carbonaceous particles such as nano-sized silicon dioxide in a liquid colloid or suspension (known as colloidal silica). Nanoparticle binder materials may also include, but are not limited to, colloidal alumina, nano-sized cerium oxide, nano-sized diamond, and mixtures thereof. Colloidal silica is preferred for use as the nanoparticle binder in certain embodiments of the present disclosure. For example, commercially available nanoparticle binders that have been used successfully include the colloidal silica solutions BINDZEL 2040 BINDZIL 2040 (available from Eka Chemicals Inc. of Marietta, Ga.) and NEXSIL 20 (available from Nyacol Nano Technologies, Inc. of Ashland, Mass.).

Before the mixture is spray dried to form the aggregates, the mixture may include an amount of nanoparticle binder material ranging between about 0.1% to about 80%, preferably ranging between about 10% to about 70% on a wet basis, more preferably about 20% to about 60%. In the spray dried abrasive aggregates, the nanoparticle binder material may constitute between about 1% to about 90% of the aggregates, preferably between about 10% to about 70% of the aggregates, and more preferably between about 15% to about 60% of the aggregates, all on a dry weight basis.

The slurry for forming the abrasive aggregates also advantageously includes a material which serves primarily as a plasticizer, also known as a dispersant, to promote dispersion of the abrasive grit within the thus formed aggregates. Further, Applicants have discovered that plasticizer components, polyols, previously used in prior art green aggregate formulations produced according to U.S. Patent Application Publication US 2008/0172951 to Starling could be replaced with dual function materials that provide plasticizer activity as well as impart beneficial anti-loading properties.

Anti-loading properties are beneficial because abrasive products are subject to "loading", wherein "swarf", or abraded material from a work surface, accumulates on the abrasive surface and between the abrasive particles. Loading is undesirable because it typically reduces the performance of the abrasive product. "Antiloading" properties reduce the tendency of an abrasive product to accumulate swarf.

Counter to known methods of applying anti-loading agents externally to a completed aggregate, for example, as part of a make coat or size coat mixture, the dual function material that acts as a plasticizer and imparts anti-loading properties is incorporated directly into the wet formula of the aggregate. Due to the low processing temperatures used, this material is believed to remain in the thus formed aggregates.

Dual function materials that act as plasticizers and anti-loading agents include both organic and inorganic materials, including surfactants and other surface tension modifying species. Particular embodiments make use of organic species, such as polymers and monomers. Particular embodiments make use of an anionic surfactant. In an exemplary embodiment the dual function material is a metallic salt of a fatty acid. For example, the metal may be sodium, aluminum, calcium, magnesium, lead, zinc, or combinations thereof, while the fatty acid may vary in length from between 12 and 22 carbons, typically lauric ($C_{12}$), myristic ($C_{14}$), palmitic ($C_{16}$), stearic ($C_{18}$), oleic ($C_{18}$, unsaturated), or linoleic ($C_{18}$, polyunsaturated) acids, or combinations thereof. In another example, the material is a stearate. A particularly preferred material is zinc stearate, general chemical formula $[CH_3(CH_2)_{16}COO]2Zn$.

In another example the dual function material is sulfonate. For example, a salt or ester of a sulfonic acid. In particular embodiments the material is a salt of a lauric ($C_{12}$) acid. A particularly preferred material is sodium lauryl sulfate, general chemical formula $CH_3(CH_2)_{11}OSO_3Na$.

In another example the dual function material is an as an alkyl sulfate. For example a lauryl sulfate. A preferred material is ammonium lauryl sulfate, general chemical formula $C_{12}H_{29}NO_4S$.

In another example the dual function material is an ether sulfate. For example sodium laureth sulfate, or sodium lauryl ether sulfate, general chemical formula $CH_3(CH_2)_{10}CH_2(OCH_2CH_2)_nOSO_3Na$.

The amount of the dual function material in the mixture, before spray drying, may range between about 0.5% to about 40%, and preferably between about 0.5% to about 10%, and more preferably from about 2% to about 8%. The amounts of the dual function material in the aggregate after spray drying may range between about 0.5% to about 20%, preferably between 0.5% to about 10%, more preferably not less than 3% and not more than 7%.

The slurry for forming the abrasive aggregates also advantageously includes a material which serves as a cross-linking agent. Applicants discovered that previous green aggregate composites produced according to U.S. Patent Application Publication US 2008/0172951 to Starling exhibited a relative weakness and were easily broken, due at least in part, to the nano silica binder not being sufficiently densified. The limited densification is attributable to the relatively low operating temperatures of the spray drying process (typically a maximum of 290° C.) and the limited amount of dwell time the aggregate mixture experiences within the spray dryer (typically only a few seconds). Applicants discovered that spray dried aggregates could be strengthened by as much as 25%, as shown in FIG. 1, by the addition of a cross-linking agent to the slurry mixture for forming the aggregate.

Cross-linking agents include carbohydrates, including polysaccahrides, monosaccahrides, and natural organic substance giving monosaccharides by hydrolysis. For example, starches, sugars, cellulose, glucose, fructose, maltose, amylopectin, amylose, cellulose. In an exemplary embodiment the cross-linker is a starch. Starches include modified starches, such as dextrin, polydextrin, cyclodextrin, maltodextrin, and combinations thereof. Dextrin includes mixtures of polymerized glucosans with a molecular formula of $(C_6H_{10}O_5)n$ that are obtained by partial hydrolysis of starch of by heat, alkali, and enzymes. A particularly preferred cross-linking agent is dextrin, which includes white dextrin, yellow dextrin, and British gum.

The concentrations of cross-linking agent in the slurry mixture, prior to spray drying may range between 0.5% and 15%, and preferably between 1% and 10%, more preferably between 2% and 9% by weight of the wet mixture. The concentrations of cross-linking agent in the aggregate after spray drying may range between 0.5% and 15%, and preferably between 1% and 10%, more preferably between 3% and 9% by weight.

As should be clear, the slurry composition used for forming the aggregates contains major species of abrasive grit, nanoparticle binder, a dual function material that acts as both a plasticizer and imparts anti-loading properties, and a cross-linking agent. These species may be present in various relative contents in the composition for forming the aggregates. The relative solids content in the spray dried aggregates should mirror the solids content in the slurry mixture composition for forming the aggregates, however there may be some alteration due to drying/volatilization during the spray drying process. The slurry composition may include about 0.1 to about 50 weight percent of the abrasive grit particles, from about 0.1 to about 80 weight percent of the nanoparticle binder, from about 0.5 to about 40 weight percent of the dual function material, and about 0.5 to about 15 weight percent of a cross-linking agent. In certain embodiments, the slurry composition can contain about 10 to about 40 weight percent abrasive grit particles, about 10 to about 70 weight percent nanoparticle binder, about 0.5 to about 10 weight percent dual function material, and about 1 to about 10 weight percent cross-linking agent. Particular embodiments of the slurry composition can contain about 20 to 40 weight percent abrasive grit particles, about 20 to 60 weight percent nanoparticle binder, about 2 to 8 weight percent dual function material, and about 2 to 9 weight percent cross-linking agent.

Optionally, a defoaming agent may be added to the slurry composition. Defoaming agents are well known in the art and an exemplary defoaming agent is a silicone-free, organic defoamer. The amount of defoaming agent in the slurry composition may be from about 0.0% to about 0.5% by weight. Any defoaming agent added is volatilized by the spray drying process and is not detectable in the formed aggregate.

A volatile liquid is also included in the composition, which acts as a carrier and serves to liquefy or fluidize the mixture of the abrasive grit particles, the nanoparticle binder material, the dual function material, the cross-linking agent, and any optionally added defoaming agent, so that the mixture may be flowed into a spray dryer, nebulized into fine aggregate droplets, and dried therein. Preferably, the volatile liquid carrier is deionized water, although other volatile liquids may be used that will be driven off by typical spray drying temperatures and do not substantially alter the composition of the mixture. The liquefied mixture may include the abrasive grit particles, the nanoparticle binder material, a dual function material, a cross-linking agent, optionally a defoaming agent, with the balance being a volatile liquid. The composition, in the form of a slurry, can be water-based and can include between about 10% to about 40% abrasive grit particles, between about 10% to about 70% nano particle binder, between about 0.5% to about 10% dual function material, about 1% to about 10% cross-linking agent, and optionally about 0% to about 0.5% defoaming agent, where percents are based on total weight of the slurry.

During processing, it should be noted that in certain embodiments according to the present disclosure, it is preferred to substantially remove any accumulated static charges from the grit particles prior to their addition to the mixture. It has been observed that the stability of the aggregates formed in the spray drying step is substantially improved if the grit particles are substantially free of accumulated Coulombic charges. Once well mixed, the liquefied mixture, including the components of the abrasive grit particle, the nanoparticle binder material, the dual function material, the cross-linking agent, and any optional defoaming agent, is then processed in a spray dryer in order to form the abrasive aggregates.

Various spray drying apparatuses may be used, including a rotary atomizer, a single fluid nozzle atomizer, and a two-fluid nozzle atomizer. For mixtures having relatively smaller abrasive grit particles, and for forming relatively smaller aggregates, the spray dryer is preferably a rotary atomizer. For mixtures having relatively larger abrasive grit particles, particularly those larger than about 80 microns, and for forming relatively larger aggregates, particularly those larger than about 90 microns, a single fluid or two-fluid nozzle atomizer may be preferred.

The spray dryer apparatus will typically include at least two material collection points, one at the cyclone and one at the bottom of the main drying chamber. Aggregates formed according to the present disclosure can be collected from both locations; however, the aggregates collected from cyclone have been observed generally be smaller in size and lighter in weight while the aggregates collected from the main drying chamber have been observed to generally be larger in size and heavier in weight. Aggregates collected from the cyclone of the dryer have been observed to typically have a size of from about 5 to about 25 microns. On the other hand, aggregates collected from the main drying chamber have been observed to typically have a size of from about 20 to about 100 microns.

To commence spray drying, the slurry is pumped into the spray dry apparatus at a generally constant rate. The slurry then passes through an atomizer or nebulizer inside the spray dryer to form generally spheroidal droplets. While passing through the atomizer, these droplets are caught up in a vortex of hot air, in which the liquid portion of the slurry essentially instantly evaporates and the solid portion of the slurry forms an aggregate. The hot air that volatilizes the liquid fraction of the slurry, leaving behind solid particles, is typically not greater than 400° C., such as not greater than 375° C., 350° C., or 300° C. Typically, spray drying is carried out at a temperature greater than about 80° C., such as greater than about 90° C. Particular embodiments have been carried out at temperatures of about 90° C. to about 250° C. It is noted that dwell times within the high temperature portion of the spray dryer are generally limited to seconds, such as 0.5 to 10 seconds, which is in stark contrast to typically heat treatment dwell times associated with sintering, calcination, or firing of typical ceramic products.

When the slurry enters the vortex of hot air the liquid is substantially driven off and the mixture is formed into a fine powder including numerous aggregates, each abrasive aggregate being generally spheroidal in shape. As used here in the term "spheroidal" refers to aggregates having a spherical shape, or a generally spherical shape, including ellipsoids and other spherical permutations, which are a consequent result of the spray drying process. Thus, spheroids include spheres, ellipsoids, truncated spheres and ellipsoids, but all generally have a rounded rather than blocky structure. As should be clear, the aggregates each contain the abrasive grit particles bound together by the nanoparticle binder material and any residue of the dual function material and cross linking agent that has not been evaporated. The final moisture content of the aggregates, after the spray drying step, is generally from about 1 to about 3 percent by weight, or less, typically less. In one embodiment, the composition of the spray dried aggregates based on weight may be between about 30% to about 75% abrasive grit particles, between about 15% to about 60% nano particle binder, between about 3% to about 10% dual function material, and about 3% to about 10% cross-linking agent where percents are based on total weight of the aggregate.

Advantageously, according the present disclosure, no further processing steps that notably modify the composition or morphology of the as-formed, unfired, green spray dried aggregates are required in order to produce usable abrasive aggregates. In fact, according to certain embodiments of the present disclosure, the method for making the aggregates consists essentially of only the aforementioned mixing and spray drying steps, and quite notably, heat treatment steps that would affect the morphology of the aggregates are avoided. In particular, no step is carried in which the materials are heated to extremely high temperatures in the range of from about 500° C. to 1000° C. or more in order to melt, sinter, or otherwise fuse the silica or other nanoparticle binder in the mixtures. Thus, in certain embodiments according to the present disclosure, all of the steps of the method of making the aggregates may be carried at temperatures of about 400° C. or less.

This stands in contrast to conventional processes for making abrasive powders with aggregated particles which typically require a sintering step at very high temperatures of from about 500° C. to 1000° C. or more.

Once formed, the aggregates may be classified, or separated into various size ranges as desired before being applied to a substrate or otherwise utilized in a polishing operation. In addition to the abrasive aggregates, the resultant powder may include an amount of material smaller than the desired grain size. The particulate material composed of the thus formed aggregates generally has an average particle size within a range of about 10 to 150 microns. Typically, the material has an average particle size not less than about 20, such as not less than about 25 microns. Upper limits for average particle size are driven by process constraints and particular end use applications, and generally the material has an average particle size not greater than about 100 microns, such as not greater than about 90, 80, or even not greater than 70 microns. In certain embodiments, the average particle size of the aggregate material is preferably between about 20 microns and 60 microns. The size, and the size range, of the aggregates may be adjusted and may depend on many factors, including the composition of the mixture and the spray dryer feed rate. For example, abrasive aggregates of sizes including those of approximately 10 microns, 20 microns, 35 microns, 40 microns, 45 microns, and 50 microns may be successfully produced using a rotary atomizing spray dryer. These aggregates may include abrasive grit particles ranging from about 5 to about 8 microns.

Figure 4:
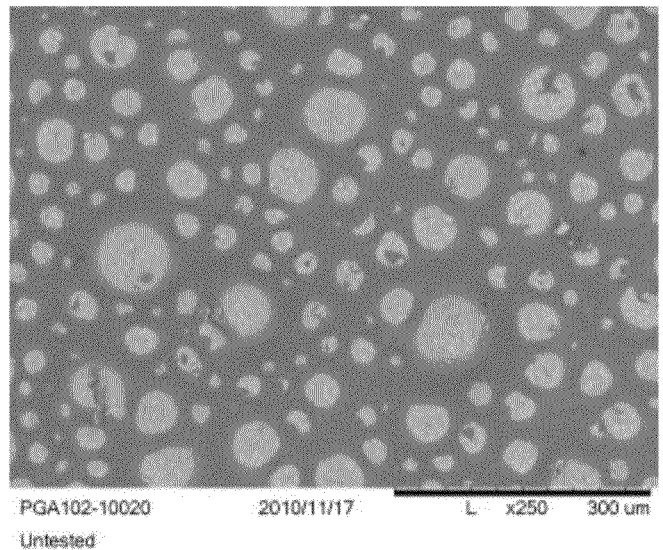
FIG. 4—is a photomicrograph taken with a scanning electron microscope showing abrasive aggregates that include silicon carbide grit combined with silica nano particles, a dual function material, and a cross-linking agent in a coating on a substrate according to one embodiment of the present disclosure prior to use.
Figure 4A:
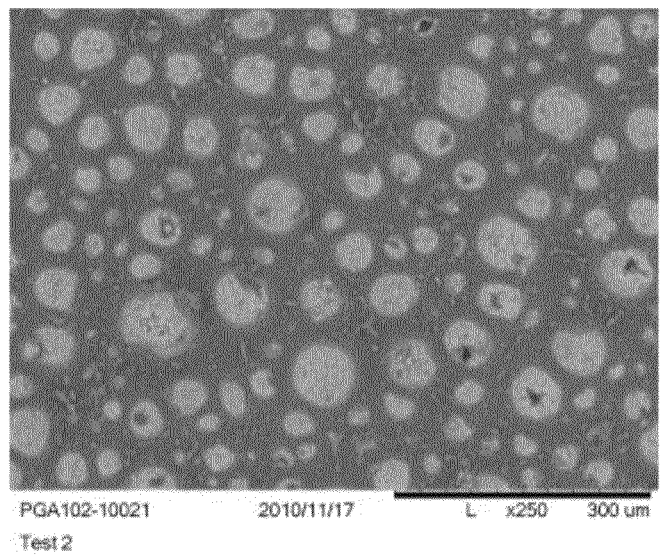
FIG. 4A—is a photomicrograph taken with a scanning electron microscope showing abrasive aggregates that include silicon carbide grit combined with silica nano particles, a dual function material, and a cross-linking agent in a coating on a substrate according to one embodiment of the present disclosure after being used.
Figure 5:
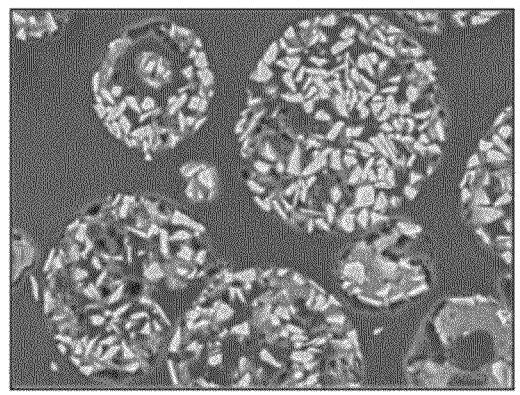
FIG. 5—is a photomicrograph taken with a scanning electron microscope showing abrasive aggregates that include silicon carbide grit combined with silica nano particles, a dual function material, and a cross-linking agent in a coating on a substrate according to another embodiment of the present disclosure prior to use.
Figure 5A:
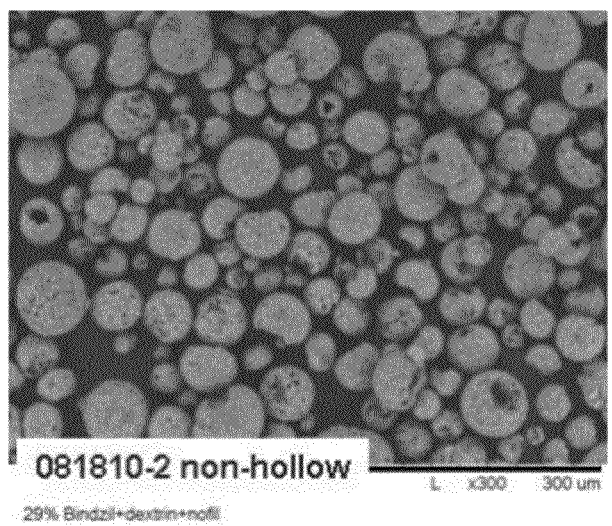
FIG. 5A—is a photomicrograph taken with a scanning electron microscope showing spheroidal and toroidal abrasive aggregates after spray drying that include silicon carbide grit combined with silica nano particles, a dual function material, and a cross-linking agent according to another embodiment of the present disclosure.
Figure 6:
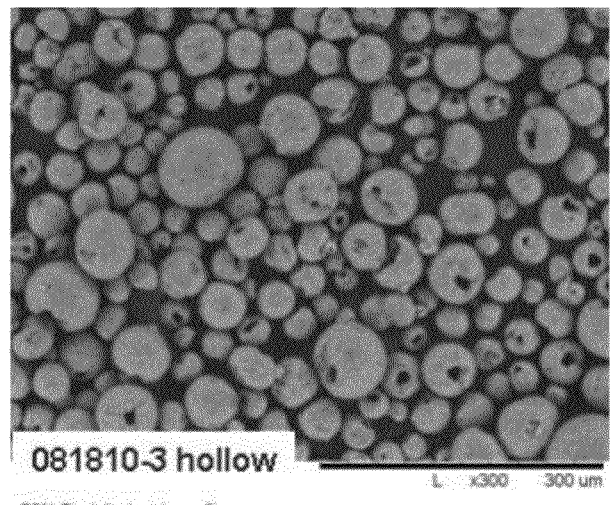
FIG. 6—is a photomicrograph taken with a scanning electron microscope showing spheroidal and toroidal abrasive aggregates after spray drying that include silicon carbide grit combined with silica nano particles, a dual function material, and a cross-linking agent according to another embodiment of the present disclosure.
Figure 6A:
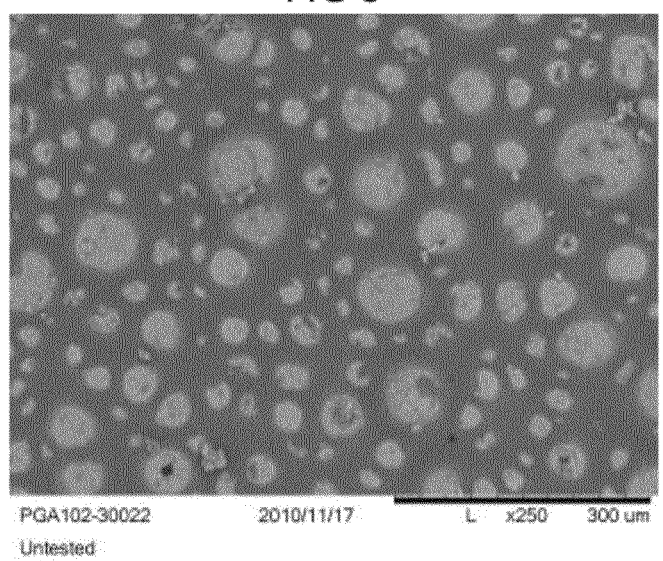
FIG. 6A—is a photomicrograph taken with a scanning electron microscope showing abrasive aggregates that include silicon carbide grit combined with silica nano particles, a dual function material, and a cross-linking agent in a coating on a substrate according to another embodiment of the present disclosure prior to use.
Figure 6B:
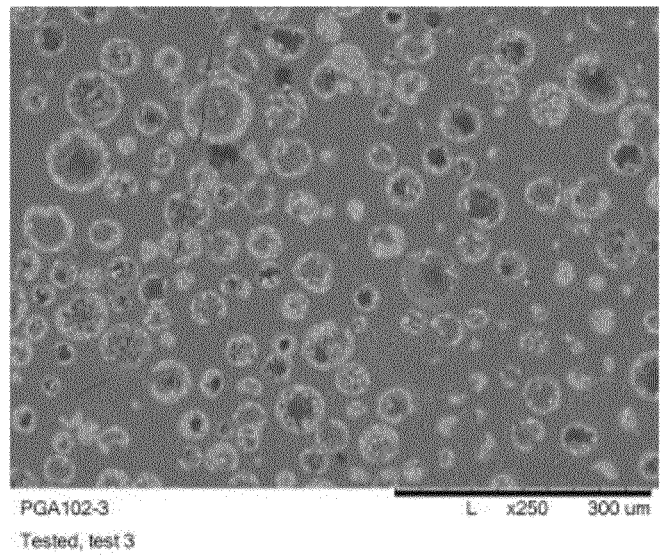
FIG. 6B—is a photomicrograph taken with a scanning electron microscope showing abrasive aggregates that include silicon carbide grit combined with silica nano particles, a dual function material, and a cross-linking agent in a coating on a substrate according to another embodiment of the present disclosure after use.
Figure 7:
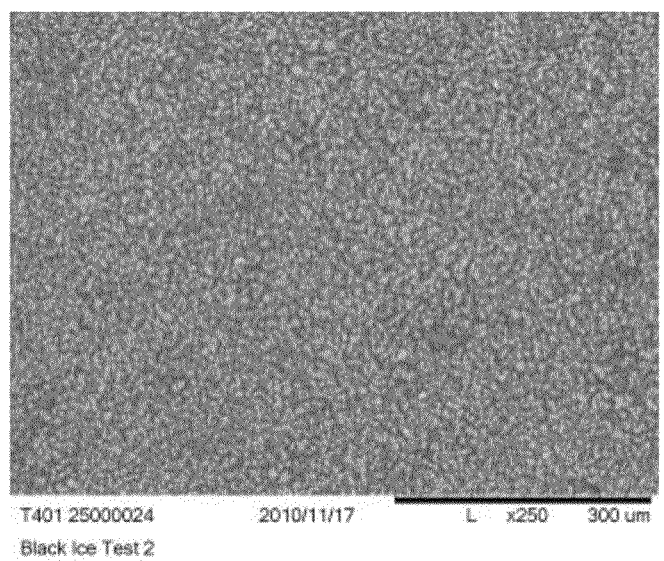
FIG. 7—is a photomicrograph taken with a scanning electron microscope showing a commercially available waterproof sandpaper that includes a mono layer of silicon single silicon carbide grit grains after use.

When viewed under magnification, the aggregates have a generally spheroidal shape, being characterized as rounded or spherical as seen in the scanning electron micrographs of FIGS. 5A and 6. In some instances, however, the aggregates may be observed to have a void near the center of the aggregate and thus exhibit a more toroid- or torus-like shape as seen in the scanning electron micrographs of FIGS. 5A and 6. Individual particles of the abrasive grit material, such a silicon carbide grit, may be observed to be dispersed over the surface of the aggregates and within the interior thereof, with relatively few instance of the individual grit particles clumping together on the surface of the aggregate. It is noted that FIGS. 4-4A, 5, 6A-6B show dispersed, individual aggregates that are bound to a substrate.

Further study of the abrasive aggregates has revealed that certain embodiments are composed of hollow spheroids. Such particles can be analogized to thick-shelled racquet balls, having a wall thickness $t_w$ within a range of about 0.08 to 0.4 times the average particle size of the aggregates. Process parameters and compositional parameters can be modified to effect different wall thicknesses, such as wall thicknesses not less than about 0.1, 0.15 times the average particle size of the aggregates. Upper limits for wall thickness may be on the order of 0.35, 0.30, 0.25, or 0.20 times the average particles size of the aggregates.

Once formed, the abrasive aggregates can be used 'as-is' with suitable classification to refine particle size distribution. While post-synthesis process steps such as excessive heat treatment are avoided, such that the aggregates are used in a green, unfired state, the aggregates can be coated with a metallurgical coating, in much the same fashion that individual abrasive grits can be coated. Metallurgical coatings nickel, titanium, copper, silver and alloys and mixtures thereof.

Once produced, the abrasive aggregates may be used directly as a loose or 'free' abrasive powder. In this context, the abrasive powder formed from the aggregates may be used as either a dry powder or a powder which has been wetted with a liquid such as water to create a slurry for improved performance. The abrasive powder may also be incorporated into a polishing paste or gel. The abrasive powder so produced may advantageously be used for the finishing and/or polishing of numerous other materials such as chemical mechanical planarization (CMP) used in the semiconductor industry, fine surface finishing of various materials, and polishing both natural and artificial dental materials. Alternatively, the aggregates are configured into a fixed abrasive, a term that broadly includes coated and bonded abrasive products.

In other embodiments of the present disclosure, however, the abrasive aggregates are preferably combined with a resin material used to adhere the aggregates onto a surface of a substrate. Processes for combining the aggregates with the resin bonding material include slurry formation, in which the aggregates, resin and other additives are combined together and coated on a substrate, or in a distinct processing pathway, aggregates are placed on a resin coated substrate through electrostatic attraction or simply through gravity (e.g., sprinkled on the substrate). The latter approach is well understood in the art, generally first depositing a 'make coat' on the substrate, aggegate application on the make coat, and subsequent deposition of a 'size coat.' Optionally, a supersize coat may be deposited over the size coat. Further, a compliant coat may be disposed between the make coat and the substrate. In another example, a back coat may be disposed over the substrate on a side opposite the make coat.

In connection with electrostatic deposition of the aggregate to the make coat of a substrate, suitable polymeric resin materials may include polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. A preferred resin is an epoxy resin. The make coat may additionally comprise other ingredients to form a binder system designed to bond the aggregate grains onto a substrate. Other optional ingredients, such as solvents, defoamers, dispersants, and pigments may be added to the make coat.

The make coat is preferably applied to the substrate using a blade spreader to form a coating. Alternatively, the make coat may be applied using slot die, gravure, or reverse gravure coating methods. The coating thickness may range from about 1 to about 5 mils in thickness, after drying. The make coat may be allowed to partially dry or may be completely wet when the substrate is passed coated side down through an electrostatic deposition station at a desired speed. Aggregates are adhered upwardly into the make coat through the application of opposite electric charges to aggregates and the coated substrate.

In particular embodiments, the make coat may be applied to the substrate at rates of about 0.5 to about 10 pounds per ream (330 sq. ft.). Similarly, aggregate may be applied at a rate of about 0.5 to about 10 pounds per ream.

Depending on the coating type, the substrate may heated in order to cure the resin and bond the aggregate grains to the substrate. In particular embodiments, the coated substrate is heated to a temperature of between about 100° C. to less than about 250° C. during this curing process. In certain embodiments of the present disclosure, it is preferred that the curing step be carried at a temperature of less than about 200° C.

Once the resin is cured and the aggregate abrasive grains are bonded to the substrate, the coated substrate is substantially finished and may be used for a variety of stock removal, finishing, and polishing applications.

In an alternative embodiment of the present disclosure, the abrasive aggregate's may be directly incorporated into the substrate. For instance, the aggregates may be mixed a polyester resin and this mixture of aggregates and polymer may then be formed into a substrate.

In an alternative embodiment of the present disclosure, the abrasive aggregates could be applied to substrates or other materials by electroplating, electric-static, spray coating and spray powder coating methods.

The abrasive-coated substrate may them be used as a lapping film or a micro-finishing film for finishing and/or polishing other materials. Substrate materials which may be coated in this manner include, but are not limited to, polyester, polyurethane, polypropylene, polyimides such as KAPTON from DuPont, non-woven materials, woven materials, paper, and metals including foils of copper, aluminum, and steel. Polyester films are particularly preferred as the substrate material is certain embodiments of the present disclosure. Suitable substrates may have a thickness, before being coated, of from about 1 to about 14 mils.

Further, the abrasive aggregates may also be incorporated into bonded abrasives, such as diamond grinding wheels and other grinding wheels. Bonded abrasives may also used to provide high traction, non-slip materials which may be applied, for example, to ladder rungs. Here, typically bonded abrasives are three dimensional structures rather than the generally planar structure of a coated abrasive, and includes a 3 dimensional matrix of bonding material in which the aggregates are embedded. That is, the bond material fixes position of the aggregates with respect to each other, and is present as an inter-agglomerate phase. While bonded abrasives utilize a wide variety of bonding agents, such as resin, glass, and metals, certain agents such as glass and metal bond materials require high temperature processing. Accordingly, to preserve the green structure of the aggregates, generally resin systems are used that do not require high cure temperatures, or which can be cured with actinic radiation such as UV.

In one embodiment according to the present disclosure, the abrasive product may be used for finishing and polishing telecommunications cables, particularly fiber optic cables. Fiber optic cables are capable of transmitting vast amounts of data at very high speed in the form of light pulses. To allow these light pulses to be effectively transmitted between interconnected fiber optic cables or between a fiber optic cable and a connected electronic device, however, the ends of the fiber optic connectors must be cleanly cut or cleaved and then highly polished to produce an extremely smooth surface and appropriate tip geometry. Abrasive substrate film produced according to the present disclosure and generally cut into disk or sheet form may be used for this purpose and have been observed to be highly effective for the polishing of the ends of fiber optic connectors.

When used for polishing fiber optic connectors, the abrasive substrate films are preferably produced from aggregates formed from diamond grit combined with silica nanoparticle binder. The grit particles preferably have a size of about 1 micron, and the overall size of the aggregates is preferably from about 30 to about 80 microns. These aggregates are preferably bonded to a polyester film substrate. Polishing of the fiber optic connector ends may be carried out on a fiber optic polishing machine. A suitable 12 connector polishing machine is available from Domaille Engineering of Rochester, Minn. and may be used with the abrasive substrate films of the present disclosure for polishing fiber optic connectors at, for example, a speed of about 60 rpm and with an applied pressure of about 8 psi.

In another embodiment according to the present disclosure, the abrasive product may be used for stock removal, finishing and polishing hard metal surfaces such as steel. When used for polishing metal surfaces, the abrasive substrate films are preferably produced from aggregates formed from diamond grit combined with a silica nanoparticle binder. The grit particles preferably have a size of about 1 micron, and the overall size of the aggregates is preferably from about 30 to about 80 microns. These aggregates are preferably bonded to polyester film substrate. Using this abrasive product, polishing of the surfaces may be carried out, for example, using a Struers metal polishing machine (available from Struers, Inc. of Westlake, Ohio) operating at a speed of 600 rpm and with an applied force of 15 newtons. Alternatively, hard metal surfaces may also be polished using abrasive aggregates formed from silicon carbide grit combined with silica.

In another embodiment according to the present disclosure, the abrasive product may be used for stock removal, finishing and polishing softer metal surfaces such as copper or brass. When used for polishing metal surfaces, the abrasive substrate films are preferably produced from aggregates formed from diamond grit combined with a silica nanoparticle binder. The grit particles preferably have a size of about 3 to 5 microns, and the overall size of the aggregates is preferably from about 30 to about 80 microns. These aggregates are preferably bonded to polyester film substrate. Using this abrasive product, polishing of the surfaces may be carried out, for example, using a Struers metal polishing machine (available from Struers, Inc. of Westlake, Ohio) operating at a speed of 150 rpm and with an applied force of 45 newtons. Alternatively, soft metal surfaces may also be polished using abrasive aggregates formed from silicon carbide grit combined with silica.

In still another embodiment according to the present disclosure, the abrasive substrate may be used for finishing and polishing coated surfaces, such as painted surfaces. In particular, the abrasive substrate film may be used to buff or polished painted automotive surfaces. When used for polishing painted automotive surfaces, the abrasive substrate films are preferably produced from aggregates formed from silicon carbide grit embedded within a silica nanoparticle binder. The grit particles preferably have a size of from about 3 to about 8 microns, and the overall size of the aggregates is preferably from about 30 to about 50 microns. These aggregates are preferably bonded to a polyester film substrate.

Other embodiments can particularly include finishing in dental applications. Here, an abrasive product such as a coated abrasive, containing green, unfired aggregates as described herein can be utilized quite successfully for finishing tooth and dental prosthetics.

The average roughness, or $R_a$, of a surface is a measure of the degree of variations in the overall height profile of a surface. A lower roughness value is generally indicative of a surface which is smoother and has smaller variations in overall height between differing locations on the surface.

Typically the polishing of materials, such as those described above, is carried out in a multi-step, incremental process. The surface is first polished with a relatively coarse abrasive material and then polished again with a somewhat finer grit abrasive material. This process may be repeated several times, which each successive re-polishing being carried out with a progressively finer grit abrasive until the surface is polished to the desired degree of smoothness. This type of multi-step polishing procedure has conventionally been required as typically the grains of an abrasive must be on the same scale as the size of the scratches which they are to remove. Certain polishing protocols use successively finer products having a grit size, and attendant Ra (with respect to both the abrasive product and on the workpiece post-machining step) reduced by a factor of three. That is, successively finer products are generally limited to reduction by a factor of three (e.g., from 9 micron, to 6 micron, to 3 micron grit sizes), in order to ensure defect removal from the preceding machining step.

Figure 2:
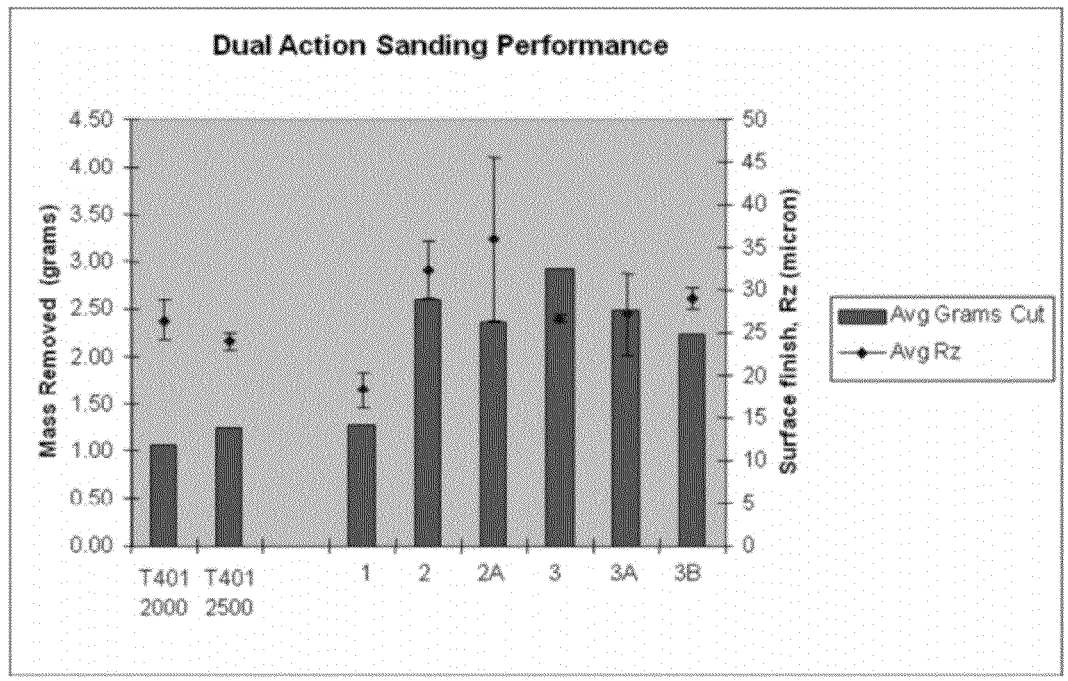
FIG. 2—is a graph comparing the mass removal rate and surface finish (Rz) achieved during a sanding test of coated abrasives discs prepared according to the present disclosure, a prior art publication, and commercially available waterproof coated abrasives.

Although there is usually an expected trade-off between material removal rate and surface quality, as shown in FIG. 2, and further described in Example 13, Applicants unexpectedly discovered that the material removal rate of coated abrasive products produced according to U.S. Patent Application Publication US 2008/0172951 to Starling could be dramatically improved by approximately double without negatively affecting surface quality to any great extent. Further, the material removal rate of embodiments of the present disclosure was also more than double over other waterproof coated abrasive products currently being marketed but an equivalent surface finish was' still achieved.

Without wanting to be held to any specific theory, it is thought that the much improved material removal rate, but still excellent surface finish, is attributable to the combination of enhanced aggregate strength and anti-loading properties that are now inherent in the aggregate. The anti-loading properties, such as enhanced lubricity, prevent the buildup of swarf, while the stronger aggregate tends to wear away more slowly. However, erosion still does occur so that fresh abrasive grains are exposed during use, thus keeping the aggregate sharp. Also, the cross-linking agent has strengthened the bonding of the nano silica particles without impeding the secondary abrasive effect of those particles, which is thought to preserve the surface finish.

It is again emphasized that the green, unfired state of the aggregates contributes to the notable machining efficacy described above. By maintaining the aggregates in the green, unfired state, it is understood that the nanoparticle binder, while composed of particles interlocked and to some extent atomically bonded together, nevertheless retains the desirable ultra-fine polishing properties of the nanoparticle particles, which properties would be destroyed through higher temperature heat treatment. That is, the multi-action nature of the aggregates is maintained through controlled process conditions, notably preventing the aggregates from being exposed to high temperatures over any sort of notable duration. Here, it is noted that it is likely not just temperature alone, but also dwell time which would be responsible for high temperature aggregate degradation. For example, during spray drying, droplets containing the solids fraction forming the aggregates are typically exposed to elevated temperatures, such as up to about 400° C., for a mere few seconds, while conventional high temperature ceramic processes such as sintering, calcination or the like generally utilize dwell times on the order of 15 minutes to multiple hours. Accordingly, it is feasible that the aggregates according to the present embodiments may maintain their green state even upon exposure to elevated temperatures, provided that such elevation is restricted to the order of seconds. Such would be the case to the extent that higher temperatures for spray drying processes were utilized.

A further advantage may be found in the surprising durability of abrasives made from the aggregates of the present disclosure. Abrasives typically wear down and gradually lose their effectiveness in removing stock material from a surface being polished or finished with the abrasive. Abrasives incorporating the aggregates of the present disclosure, however, have been observed to have significantly improved durability as compared to conventional abrasives materials. When used in comparable applications, abrasives incorporating the aggregates of the present disclosure have been observed to retain their effectiveness for more than twice as long as conventional abrasive materials, and in some instances, up to 20 times as long.

The properties and advantage of the present disclosure are illustrated in further detail in the following nonlimiting examples. Unless otherwise indicated, temperatures are expressed in degrees Celsius, and concentrations are expressed in weight percentages based upon the overall dry weight of the abrasive aggregates.

Example 1

Impact of Cross-Linking Agent on Aggregate Strength

Applicants prepared spray dried aggregates containing SiC abrasive grains according to U.S. Patent Application Publication US 2008/0172951 to Starling. The original plasticizer of Starling was used, not the dual function material of the embodiments of the present disclosure. A cross-linking agent, dextrin, was added in various amounts to five samples. A control sample without the cross-linking agent was also produced. The only difference between the aggregates produced was the amount of cross-linking agent incorporated.

The aggregate samples subjected to a crush test as follows: the aggregates were screened at a mesh size of 200 and 5 grams of each sample were placed in a one inch die. The die was then subjected to a pressure of 5 MPa. The collected aggregate was again screened and the amount that passed through to be collected on a 270 mesh was recorded. The higher the % of material that passed through (−200/+270), the greater the amount of material that was crushed, indicating a weaker aggregate. FIG. 1 shows a chart of the relative strength of the sample aggregates compared to the control sample. As shown, a relative strength improvement of up to 25% was achieved by the addition of the cross-linking agent.

Example 2

Impact of Dual Function Material on Aggregate Strength

Aggregates containing dextrin and zinc stearate were prepared according to the present disclosure, and subjected to a crush test as described in Example 1. The results are shown as follows.

| Aggregate Composition (dry wt %) | Bond Wt % | Crush % (−200/+270) |
|---|---|---|
| Bindzil2040 + 5.7% dextrin | 50.3 | 46 |
| Bindzil2040 + 5.7% dextrin + 3.5% Zn stearate | 53.9 | 34 |
| Bindzil2040 + 5.7% dextrin + 6.7% Zn stearate | 55.8 | 33 |

The bond wt % is equal to the sum of the dry weight percents of the components of the spray dried aggregate excluding the weight of the abrasive grains. The results show that the initial addition of zinc stearate does contribute an improvement to the strength of the aggregate, but that increasing the amount of the zinc stearate does not improve the strength by an appreciable amount. Thus, primary contributor to aggregate strength is the dextrin.

Example 3

Production of Aggregate 1-Starling

A slurry mixture for forming fine abrasive aggregates including silicon carbide grit combined with silica nanoparticles was produced by the following method, according to U.S. Patent Application Publication US 2008/0172951 to Starling. Aqueous colloidal silica was mixed with green silicon carbide grit (NGC 2500, available from Nanko Abrasives, Inc. of Tokyo, Japan), JIS graded (JIS2500), having an average particle size of 5.5 microns, along with a polyethylene glycol (PEG) 200 plasticizer and deionized water. The silica sol used was BINDZIL 2040, available from Eka Chemicals Inc. of Marietta, Ga., which is believed to be aqueous colloidal silica solution having about 40% silica ($SiO_2$) by weight, a silica particle size of about 20 nm, and a base-stabilized pH of about 10.

The components were mixed in the following amounts:

| Component | Grams in mixture | Wt. % in mixture |
|---|---|---|
| BINDZIL 2040 silica sol | 3600 | 62.9 |
| PEG 200 | 220 | 3.8 |
| Deionized water | 300 | 5.2 |
| NGC 2500 grit | 1600 | 28.0 |
| Total | 5720 | 100 |

The components were thoroughly mixed using a high shear mixer to provide a uniform aqueous dispersion having about 53% solids in water.

The mixture was then spray dried using a Pentronix Model 370 rotary atomizer spray dryer. The mixture was fed at room temperature into the inlet of the spray dryer at a temperature of about 240° C. The outlet temperature of the spray dryer was measured to be about 120° C. The spray drying process substantially removed the water from the mixture and the remaining components were observed to form a powder of small, generally round, hollow aggregates which were collected for analysis. About 80 to 90% of the aggregate particles were collected from the dryer cyclone unit and about 10 to 20% were collected from the main drying of the spray dryer apparatus. No further sintering or heating was required to form the aggregates.

The components of the dry aggregate were estimated to be in the following amounts based on the assumption that all water was removed during the spray drying process:

| Component | Wt. % in aggregate |
|---|---|
| BINDZIL 2040 silica sol | 44.2 |
| PEG 200 | 6.7 |
| Deionized water | 0 |
| NGC 2500 grit | 49.1 |
| Total | 100 |

Figure 3:
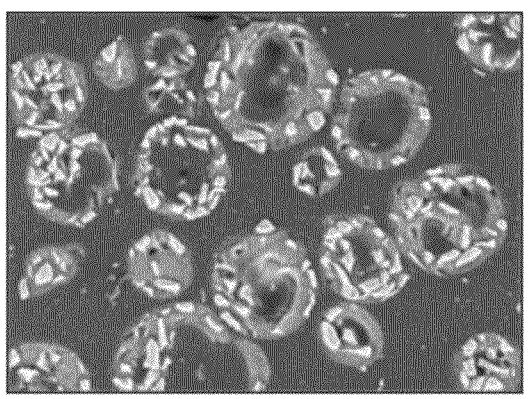
FIG. 3—is a photomicrograph taken with a scanning electron microscope showing abrasive aggregates that include silicon carbide grit combined with silica nano particles, and a plasticizer in a coating on a substrate according to the prior art.

The aggregates were examined under magnification and observed to be formed of a phase of silica nanoparticles and PEG combined with particles of the silicon carbide grit. The average size of the aggregates collected from the chamber was measured to be in the range of about 10 to 60 microns, with a $D_{50}$ equal to 60 microns. The dry aggregates had a bond wt % of about 47%. The aggregates are shown in FIG. 3. after having been applied to a substrate to form an a coated abrasive product.

Example 4

Aggregate 2

A slurry mixture for forming fine abrasive aggregates including silicon carbide grit combined with silica nanoparticles was produced by the following method. Aqueous colloidal silica was mixed with green silicon carbide grit (NGC 2500, available from Nanko Abrasives, Inc. of Tokyo, Japan), JIS graded (JIS2500), having an average particle size of 5.5 microns, along with zinc stearate, dextrin, deionized water, and a defoaming agent. The silica sol used was BINDZIL 2040, available from Eka Chemicals Inc. of Marietta, Ga., which is believed to be aqueous colloidal silica solution having about 40% silica ($SiO_2$) by weight, a silica particle size of about 20 nm, and a base-stabilized pH of about 10. The defoaming agent was SURFYNOL DF-210 defoamer, available from Air Products and Chemicals Inc. of Allentown, Pa.

The components were mixed in the following amounts:

| Component | Grams in mixture | Wt. % in mixture |
|---|---|---|
| BINDZIL 2040 silica sol | 960 | 22.5 |
| Zinc Stearate | 160 | 3.8 |
| Dextrin | 128 | 3.0 |
| Deionized water | 1410 | 33.1 |
| Defoaming agent | 7.2 | 0.2 |
| NGC 2500 grit | 1600 | 37.5 |
| Total | 4265.2 | 100 |

The components were thoroughly mixed using a high shear mixer to provide an a uniform aqueous dispersion having about 53.1% solids in water.

The mixture was then spray dried using the same Pentronix brand spray dryer. The mixture was heated and fed into the inlet of the spray dryer at a temperature of about 240° C. The outlet temperature of the spray dryer was measured to be about 120° C. The spray drying process substantially removed the water from the mixture and the remaining components were observed to form a powder of small, generally round, solid aggregates. The aggregates produced were collected for analysis with about 80 to 90% of the particles being collected from the dryer cyclone unit and about 10 to 20% being collected from the main drying of the spray dryer apparatus. No further sintering or heating was required to form the aggregates.

The components of the dry aggregate were determined to be in the following amounts based on the assumption that all water was removed during the spray drying process:

| Component | Wt. % in aggregate |
|---|---|
| BINDZIL 2040 silica sol | 16.9 |
| No-fil | 7.0 |
| Dextrin | 6.1 |
| Deionized water | 0 |
| Defoaming agent | 0 |
| NGC 2500 grit | 70.4 |
| Total | 100 |

The aggregates were examined under magnification and observed to be formed of a phase of silica nanoparticles, zinc stearate, and dextrin, combined with particles of the silicon carbide grit. The typical size of the aggregates appeared to have a normal distribution in the range of about 10 to about 60 microns, with a $D_{50}$ equal to 60 microns. The dry aggregates had a bond wt % of about 29%. The aggregates are shown in FIG. 4 after collection from the spray drier and in FIG. 4A after having been applied to a substrate to form a coated abrasive product.

Example 5

Aggregate 3

A slurry mixture for forming fine abrasive aggregates including silicon carbide grit combined with silica nanoparticles was produced by the following method. Aqueous colloidal silica was mixed with green silicon carbide grit (NGC 2500, available from Nanko Abrasives, Inc. of Tokyo, Japan), JIS graded (JIS2500), having an average particle size of 5.5 microns, along with zinc stearate, dextrin, deionized water, and a defoaming agent. The silica sol used was BINDZIL 2040, available from Eka Chemicals Inc. of Marietta, Ga., which is believed to be aqueous colloidal silica solution having about 40% silica ($SiO_2$) by weight, a silica particle size of about 20 nm, and a base-stabilized pH of about 10. The defoaming agent was SURFYNOL DF-210 defoamer, available from Air Products and Chemicals Inc. of Allentown, Pa.

The components were mixed in the following amounts:

| Component | Grams in mixture | Wt. % in mixture |
|---|---|---|
| BINDZIL 2040 silica sol | 3440 | 57.3 |
| Zinc Stearate | 228 | 3.8 |
| Dextrin | 180 | 3.0 |
| Deionized water | 720 | 12.0 |
| Defoaming agent | 14.2 | 0.2 |
| NGC 2500 grit | 1416 | 23.6 |
| Total | 5998.4 | 100 |

The components were thoroughly mixed using a high shear mixer to provide a uniform aqueous dispersion having about 53.1% solids in water.

The mixture was then spray dried using the same Pentronix brand spray dryer. The mixture was heated and fed into the inlet of the spray dryer at a temperature of about 240° C. The outlet temperature of the spray dryer was measured to be about 120° C. The spray drying process substantially removed the water from the mixture and the remaining components were observed to form a powder of small, generally round, hollow aggregates. The aggregates produced were collected for analysis with about 80 to 90% of the particles being collected from the dryer cyclone unit and about 10 to 20% being collected from the main drying of the spray dryer apparatus. No further sintering or heating was required to form the aggregates.

The components of the dry aggregate were determined to be in the following amounts based on the assumption that all water was removed during the spray drying process:

| Component | Wt. % in aggregate |
|---|---|
| BINDZIL 2040 silica sol | 43.0 |
| No-fil | 7.1 |
| Dextrin | 6.1 |
| Deionized water | 0 |
| Defoaming agent | 0 |
| NGC 2500 grit | 44.3 |
| Total | 100 |

The aggregates were examined under magnification and observed to be formed of a phase of silica nanoparticles, zinc stearate, and dextrin, combined with particles of the silicon carbide grit. The typical size of the aggregates appeared to have an average size in the range of about 10 microns to about 60 microns, with a $D_{50}$ equal to 60 microns. The dry aggregates had a bond wt % of about 56%. The aggregates are shown in FIG. 5 after collection from the spray drier.

Example 6

Aggregates Crush Test

A crush test was performed on the aggregates produced in Examples 2-4 according to the method described in Example 1. The results are shown in the following table.

| Sample | Bond Wt % | Crush % (−200/+270) |
|---|---|---|
| Aggregate 1 | 47.4 | 42 |
| Aggregate 2 | 29.3 | 57 |
| Aggregate 3 | 55.6 | 32 |

The crush test shows that Aggregate 3, which contained dextrin, zinc stearate, and had a comparable bond wt % to Aggregate 1, exhibited an improved strength compared to Aggregate 1, which did not contain the dextrin and zinc stearate. Aggregate 2, although containing dextrin and zinc stearate, was more greatly crushed than Aggregate 1. The weakness is explained by the fact that the bond wt % is much lower than the bond wt % of Aggregate 1.

Example 7

Coated Abrasive, Aggregate 1

In this example, aggregates produced as described in Example 3 above, were bonded to a substrate to produce a water proof coated abrasive product. The aggregates were applied to the substrate using an electrostatic deposition process. The substrate was a roll of NPP-0052K Berry Plastics Backing film (available from Berry Plastics Corporation of Evansville, Ind.) coated with a make coat comprising an aqueous dispersion of epoxy resin (EPI-REZ Resin 5003-W-55 available from Momentive Specialty Chemicals Inc. of Columbus, Ohio). The components and amounts in the make coat were as follows:

| Component | Wt % in make coat |
|---|---|
| EPI-REZ 5003-W-55 | 86.54 |
| TRM0425 | 1.56 |
| Water | 6.27 |
| Zonal FSJ | 1.32 |
| Nalco 2311 | 0.12 |
| Imperial Black Dye | 2.47 |
| Tamol 165A | 1.73 |

The make coat was mixed in order to provide a substantially uniform adhesive mixture and applied to one surface of the substrate using a blade coating system. The aggregate was then applied using an electrostatic deposition process. The adhesive coated backing was advanced though an electrostatic deposition station at a rate of about 50 feet per minute. The make coat adhesive mixture was applied to the substrate at the rate of about 1 lb/ream (1 lb/330 sq. ft.) and the aggregate was applied to the make coat at the rate of about 3 lb/ream (3 lb/330 sq. ft.).

After the aggregate was applied, the make coat was cured at a temperature of 180 to 240° F. for 1 hr; then a size coat was applied and cured under the same condition. After curing, the aggregates were substantially bonded to the substrate to produce a finished coated abrasive.

The finished coated abrasive product was thereafter cut into a plurality of abrasive discs.

Example 8

Coated Abrasive, Aggregate 2

In this example, the aggregates produced as described in Example 4 above, were bonded to a substrate in the same manner as described in Example 7 to produce a coated abrasive product, however, the make coat adhesive mixture was applied to the substrate at the rate of about 1.3 lb/ream (1.3 lb/330 sq. ft.) and the aggregate was applied to the make coat at the rate of about 4.4 lb/ream (3 lb/330 sq. ft.).

The finished coated abrasive product was thereafter cut into a plurality of abrasive discs.

Example 9

Coated Abrasive Aggregate 2A

In this example, the aggregates produced as described in Example 4 above, were bonded to a substrate in the same manner as described in Example 7 to produce a coated abrasive product, however the make coat adhesive mixture was applied to the substrate at the rate of about 1.6 lb/ream (1.6 lb/330 sq. ft.) and the aggregate was applied to the make coat at the rate of about 3.2 lb/ream (3.2 lb/330 sq. ft.).

The finished coated abrasive product was thereafter cut into a plurality of abrasive discs.

Example 10

Coated Abrasive Aggregate 3

In this example, the aggregates produced as described in Example 5 above, were bonded to a substrate in the same manner as described in Example 7 to produce a coated abrasive product, however the make coat adhesive mixture was applied to the substrate at the rate of about 1.4 lb/ream (1.4 lb/330 sq. ft.) and the aggregate was applied to the make coat at the rate of about 3.4 lb/ream (3.4 lb/330 sq. ft.).

The finished coated abrasive product was thereafter cut into a plurality of abrasive discs.

Example 11

Coated Abrasive Aggregate 3A

In this example, the aggregates produced as described in Example 5 above, were bonded to a substrate in the same manner as described in Example 7 to produce a coated abrasive product, however the make coat adhesive mixture was applied to the substrate at the rate of about 1.6 lb/ream (1.6 lb/330 sq. ft.) and the aggregate was applied to the make coat at the rate of about 0.8 lb/ream (0.8 lb/330 sq. ft.).

The finished coated abrasive product was thereafter cut into a plurality of abrasive discs.

Example 12

Coated Abrasive Aggregate 3B

In this example, the aggregates produced as described in Example 5 above, were bonded to a substrate in the same manner as described in Example 7 to produce a coated abrasive product, however the make coat adhesive mixture was applied to the substrate at the rate of about 1.4 lb/ream (1.4 lb/330 sq. ft.) and the aggregate was applied to the make coat at the rate of about 2.3 lb/ream (2.3 lb/330 sq. ft.).

The finished coated abrasive product was thereafter cut into a plurality of abrasive discs.

Example 13

Dual Action Sanding Test

In this example, the abrasive discs produced according to Examples 7-12, above were attached to a 5 inch dual-action rotating sander (Dynorbital® Sander, made by Dydabrade, Clarence, N.Y.) and used to abrade a substrate for a single cycle of 2 minutes, at a speed of 12,000 RPM while applying hand pressure of about 8 pounds (~0.5 PSI) using a circular motion. The rate of substrate material removed and the resulting substrate surface roughness (Rz and Ra) were recorded for each coated abrasive sample disc tested.

A ¼ inch thick poly(methyl methacrylate) panel measuring 7 inches by 8 inches was obtained to serve as the substrate for each coated abrasive disc that was tested. Three discs each of coated abrasive 1, coated abrasive 2, coated abrasive 2A, coated abrasive 3, coated abrasive 3A, and coated abrasive 3B were tested. The average mass removal rate in grams and the average surface roughness produced on the test substrate are presented in FIG. 2.

Additionally, three discs each of two currently marketed waterproof coated abrasive products, Black Ice T401-P2000, and Black Ice T401-P2500, (available from Saint-Gobain Abrasives of Worcester, Mass.) were tested for comparison purposes. The Black Ice T401-P2000 product possessed a layer of single silicon carbide grains of grit size P2000. The Black Ice T401-P2500 product possessed a layer of single silicon carbide grains of grit size P2500. The average mass removal rate in grams and the average surface roughness produced on the test substrates are also presented in FIG. 2.

It can be seen from FIG. 2 that all the embodiments of the present disclosure (2, 2A, 3, 3A, and 3B) had a surprisingly good mass removal rate more than double that of the Black Ice products, yet the surface finish was unexpectedly still within about 5 microns of the Black Ice products for 3, 3A, and 3B, and within about 10 microns for 2 and 2A.

FIG. 2 also showed that all the embodiments of the present disclosure (2, 2A, 3, 3A, and 3B) had surprisingly good mass removal rates more than double that of Starling (1) and yet the surface finish was still within about 8 to 16 microns of Starling.

In addition to being used as abrasives, in some embodiments of the present disclosure, the aggregates may also be used in application other than abrasives for polishing and finishing of materials. For instance, it is believed that the aggregates of the present disclosure may be incorporated into lubricant formulations. The aggregates may also be incorporated into composite materials for the purpose of enhancing the strength of the composites. In addition, it is believed that the aggregates may also be employed as a heat sink material in certain applications.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An aggregate forming mixture comprising:
   an aqueous slurry comprising
   about 0.1 to about 50% by wt. of a plurality of microparticle abrasive grains;
   about 0.1 to about 80% by wt. of a nanoparticle binder;
   about 0.5 to about 40% by wt. of a dual function material; and
   about 0.5 to about 15% by wt. of a cross-linking agent.

2. The aggregate forming mixture of claim 1 wherein the dual function material is a metallic salt of a fatty acid.

3. The aggregate forming mixture of claim 2 wherein the metal of the metallic acid salt is selected from the group consisting of sodium, aluminum, calcium, magnesium, lead, zinc, or combinations thereof.

4. The aggregate forming mixture of claim 2 wherein the fatty acid is selected from the group consisting of lauric, myristic, palmitic, stearic, oleic, linoleic, or combinations thereof.

5. The aggregate forming mixture of claim 2 wherein the dual function material is zinc stearate.

6. The aggregate forming mixture of claim 1 wherein the cross-linking agent is a selected from the group consisting of starches, sugars, cellulose, glucose, fructose, maltose, amylopectin, amylose, cellulose or combinations thereof.

7. The aggregate forming mixture of claim 1 wherein the cross-linking agent is a selected from the group consisting of dextrin, polydextrin, cyclodextrin, malto-dextrin, or combinations thereof.

8. An aggregate comprising:
about 0.1 to about 85% by wt. of a plurality of abrasive microparticles;
about 1 to about 90% by wt. of a nanoparticle binder;
about 0.5 to about 20% by wt. of a dual function material; and
about 0.5 to about 15% by wt. of a cross-linking agent.

9. The aggregate of claim 8 wherein the aggregate has a generally spheroidal or toroidal shape.

10. The aggregate of claim 8 wherein the aggregate is green and unfired.

11. The aggregate of claim 8 wherein the aggregate has a size not less than 10 microns and not more than 80 microns.

12. The aggregate of claim 8 wherein the dual function material is zinc stearate and the cross-linking agent is dextrin.

13. A coated abrasive product, comprising:
a substrate; and
particulate material bonded to the substrate, the particulate material comprising green, unfired abrasive aggregates having a generally spheroidal or toroidal shape, the aggregates formed from a composite composition comprising abrasive grit particles having an average particle size between about 0.1 microns and about 50 microns contained within a nanoparticle binder, wherein the nanoparticle binder comprises particles having an average particles size of less than about 100 nm, a dual function material, and a cross-linking agent.

14. The coated abrasive product of claim 13, wherein the nanoparticle binder forms a continuous matrix phase in which the abrasive grit particles are uniformly distributed.

15. The coated abrasive product of claim 13, wherein the aggregates having said spheroidal shape are hollow.

16. The coated abrasive product of claim 13, wherein the nanoparticle binder has an average particle size of less than 80 nanometers.

17. A method for forming abrasive particulate material, comprising:
forming a slurry comprising a liquid carrier, abrasive grit particles, a nanoparticle binder, a dual function material, and a cross-linking agent; and
spray drying the slurry to form green, unfired composite aggregates comprising the abrasive grit particles contained within the nanoparticle binder, the dual function material, and the cross-linking agent, wherein the nanoparticle binder constitutes between about 15% to about 60% of the aggregate on a dry weight basis; and
classifying the aggregates for use in an abrasive product.

18. An aggregate comprising:
a plurality of abrasive microparticles;
a nanoparticle binder;
a dual function material; and
a cross-linking agent,
wherein the aggregate has a generally spheroidal or toroidal shape.

19. An aggregate comprising:
a plurality of abrasive microparticles;
a nanoparticle binder;
a dual function material; and
a cross-linking agent,
wherein the aggregate has a size not less than 10 microns and not more than 80 microns.

* * * * *